Nov. 5, 1929.  J. E. KEYS ET AL  1,734,133
CHEESE CUTTER
Filed Oct. 1, 1928  2 Sheets-Sheet 1

Inventors
J. E. Keys
O. P. Keys
By Lacey & Lacey, Attorneys

Nov. 5, 1929. J. E. KEYS ET AL 1,734,133
CHEESE CUTTER
Filed Oct. 1, 1928  2 Sheets-Sheet 2

Inventors
J. E. Keys
O. P. Keys
By Lacey & Lacey, Attorneys

Patented Nov. 5, 1929

1,734,133

UNITED STATES PATENT OFFICE

JOHN E. KEYS AND OPIE P. KEYS, OF ELIZABETHTON, TENNESSEE

CHEESE CUTTER

Application filed October 1, 1928. Serial No. 309,497.

This invention has for its object the provision of a simple mechanism whereby portions of a square cheese or a cheese of rectangular cross section may be accurately cut therefrom for retail sales. The invention provides means whereby a cutter arranged to move vertically through the cheese at a right angle to the longitudinal axis thereof may be shifted readily in a rectilinear path parallel with the longitudinal axis of the cheese and manipulated to sever a desired section of the cheese. The invention also provides an indicator which is arranged to cooperate with the cutter and is movable therewith whereby the user of the apparatus may determine with accuracy just how much of the cheese is to be cut therefrom to meet a given demand. The invention also provides means whereby the cutter may be very quickly brought into an approximate adjustment and then more finely adjusted so as to attain the desired accuracy in the cutting of the cheese. The invention is illustrated in the accompanying drawings and will be hereinafter fully set forth.

Figure 1:
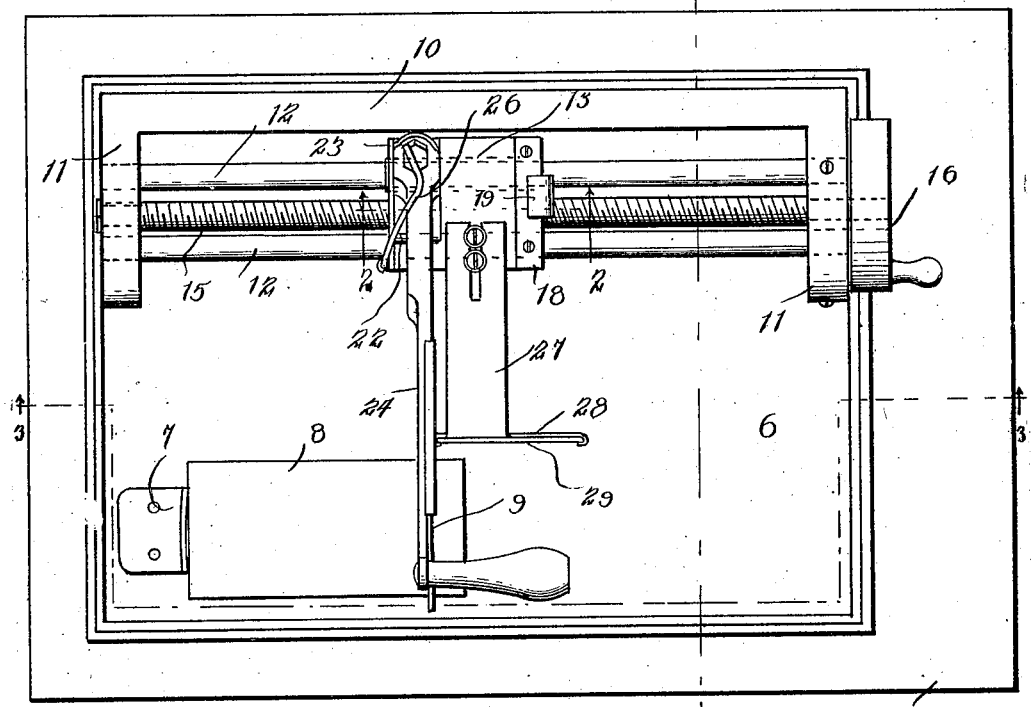
Figure 1 is a plan view of a cheese cutter embodying our invention, the outer casing being removed.

In carrying out the invention, there is provided a housing comprising a bed plate 1 and a cover 2 which is hinged at one end, as shown at 3, to the bed plate and is adapted to rest firmly thereon, openings 4 being provided in the end walls of the cover for ventilation and screens 5 of any approved form being secured over the openings to prevent the ingress of insects to the cheese. Disposed within the housing and fixed to the bed plate 1 is a bottom table or cutting board 6 having a lug or post 7 adjacent one end and constituting a stop against which one end of the cheese, indicated at 8, may be placed. The cheese will extend parallel with the forward edge of the cutting board 6 and its end more remote from the stop 7 is subjected to the action of a knife 9 when portions are to be cut therefrom.

Figure 2:
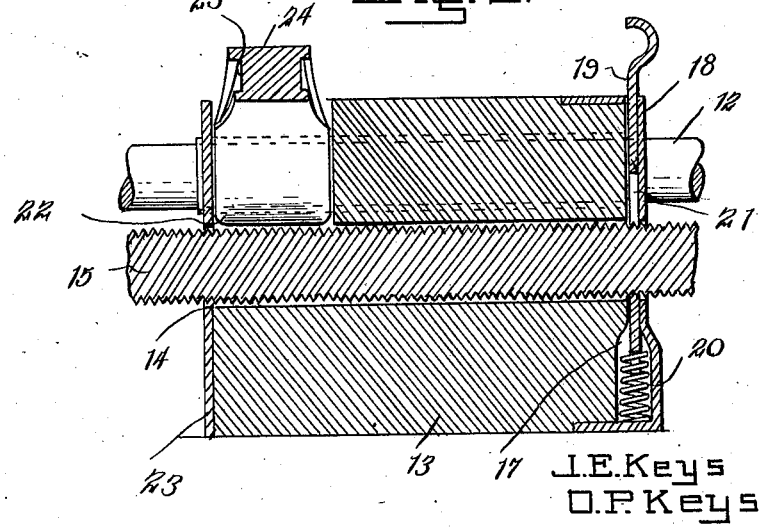
Fig. 2 is an enlarged detail section on the line 2—2 of Fig. 1.

At the back edge of the cutting board 6, there is provided a back frame 10 having end members 11 in which are fitted and secured the ends of guide rods 12 which are disposed parallel with the front and rear edges of the cutting board and constitute supports and guides for a carriage 13. The carriage 13 may be of any approved form and is shown as a block of wood or other material having openings therethrough to slidably engage the rods 12 so that the carriage may be easily moved along said rods. The carriage is also provided with an approximately central passage 14 through which passes a screw or threaded rod 15 having smooth ends which are journaled in the end members 11 of the back frame, one of said extremities of the screw or threaded rod extending beyond the adjacent bearing member 11 and being equipped with a crank disk or other operating element 16, as shown and as will be understood. At one end of the carriage 13, there is formed a vertical recess 17 therein which recess or channel passes across the end of the opening 14, as will be understood upon reference to Fig. 2. Fitted over the channel or recess 17 is a cover 18 which may be secured to the end of the carriage in any desired manner and serves to retain against the end of the carriage a latch 19. The lower end of the latch rests upon an expansion spring 20 resting upon the bottom of the cover 18, as shown clearly in Fig. 2, and tending constantly to raise the latch which is provided between its ends with a vertical slot 21 receiving the threaded rod 15 and having its lower wall properly threaded to engage the threads of the rod and thereby serve as a nut in cooperation with the rod. By depressing the latch against the tension of the spring 20, it will be released from the screw or threaded rod 15 and the carriage and the parts mounted thereon may then be quickly moved longitudinally of the guide rods 12 in either direction so as to approximately adjust the cutter into the proper relation to the cheese. If the latch be then released, the spring will instantly cause it to engage the threaded rod which may then be rotated through manipulation of the handle member 16 and by its engagement with the latch, now constituting a nut, will bring the cutter into the exact position required to sever from the cheese the desired quantity.

Figure 5:
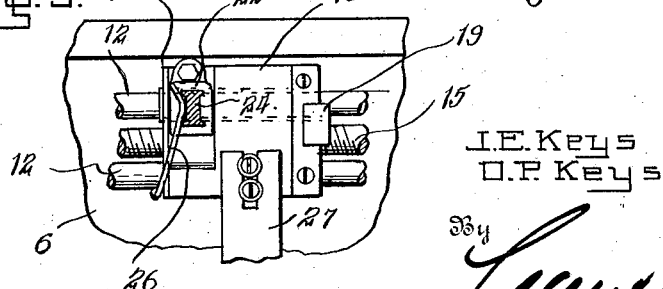
Fig. 5 is a detail plan view more particularly showing the means for holding the cutter in raised position.

At the end of the carriage distant from the latch in the upper side thereof, there is a recess 22 covered at the outer side by a plate 23 and within which a lever 24 is secured upon a sleeve extending into the carriage and encircling the upper rear guide rod 12, the lever extending forwardly and upwardly and having the knife 9 secured to one side near its free end, as will be understood from the drawings. The lever at its pivoted end is provided with a longitudinal groove 25 in one side and a holding spring 26 is secured to one side of the cover 23 and extends upwardly and rearwardly therefrom and is bowed, as shown most clearly in Figs. 1 and 5, whereby when the lever 24 is raised the spring will engage in the groove 25 and thereby support the lever in its raised position so that the carriage with the lever and the blade may be safely adjusted without liability of the knife scraping along the top or the side of the cheese. This means for holding the lever in a raised position is also advantageous when a whole new cheese is to be placed in position to be cut.

Figure 3:
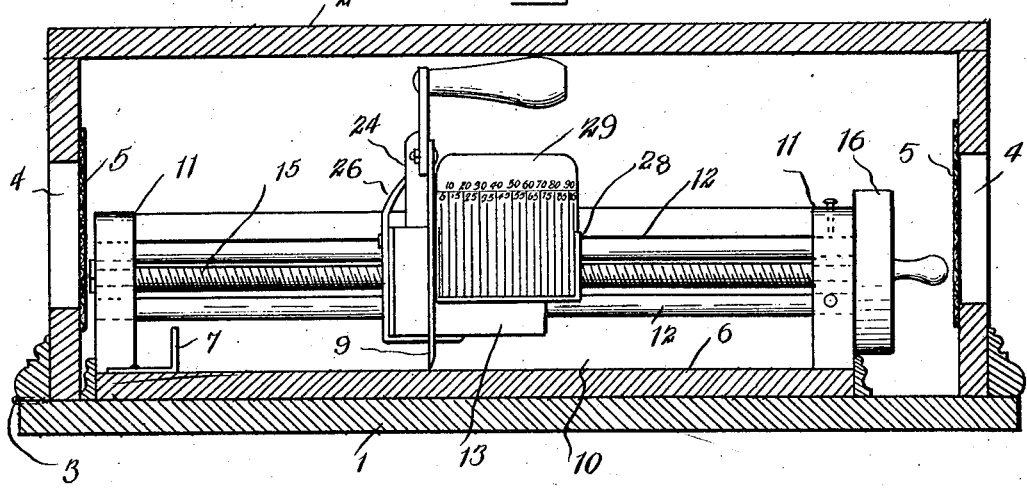
Fig. 3 is a vertical section on the line 3—3 of Fig. 1.
Figure 4:
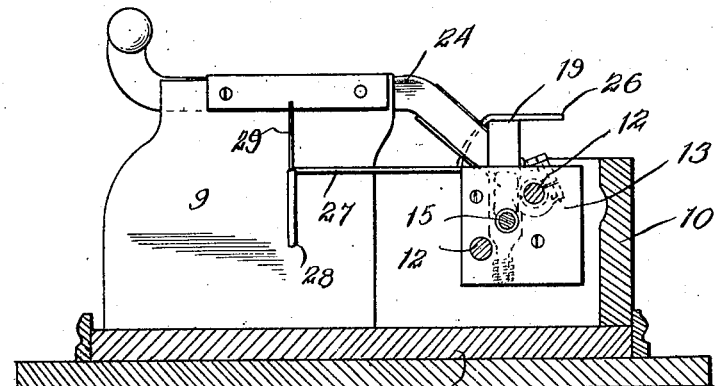
Fig. 4 is a transverse section on the line 4—4 of Fig. 1.

A bracket arm 27 is secured to the top of the carriage and projects forwardly therefrom, as shown in Figs. 1 and 4, and at its front end is formed into or has secured thereto a pocket 28 in which may be placed an indicator chart 29. As shown most clearly in Fig. 3, this chart is ruled with vertical lines and at the upper ends of the lines are displayed numerals indicating sales values, and it will be understood that the spacing of the lines and the numerals to be displayed at the upper ends of the several lines will be determined by the price unit at which the cheese is to be sold. A plurality of these indicator charts or tickets will be provided and any one of them may be used according to the sales price of the cheese.

In adjusting the carriage, it will be so set that the vertical line bearing a numeral corresponding to the quantity desired by the purchaser will aline with the end of the cheese, as will be understood upon reference to Fig. 1, and the knife blade 9 is then caused to pass downwardly through the cheese by pressure applied to the lever 24 in an obvious manner. It will be noted that the chart is disposed close to the cutter so that whatever the price unit of the cheese may be the distance between the working edge of the cutter and the vertical indicator line upon the chart close to the cutter will be equal to the minimum quantity of cheese that will be sold.

It will be readily seen from the foregoing description, taken in connection with the accompanying drawings, that we have provided an exceedingly simple and compact mechanism which may be readily adjusted and manipulated to cut from a cheese any desired quantity. The cut will be always made with certainty so that the customer will be assured of getting the quantity of cheese for which he paid and the storekeeper will be guarded against loss. A clean cut will be made through the cheese at a right angle to the sides thereof so that the cut end will always be even and sightly.

Having thus described the invention, we claim:

1. A cheese-cutting mechanism comprising a carriage, means for adjusting the carriage including a threaded rod having its ends mounted in fixed bearings, the carriage having a longitudinal opening through which the rod passes, a vertically slidable latch mounted upon one end of the carriage, yieldable means below the latch to hold it in engagement with the rod to serve as a nut therefor, the latch projecting above the carriage whereby it may be depressed and released from the rod and a cutter mounted on the opposite end of the carriage.

2. A cheese-cutting mechanism comprising a carriage, guide rods constituting a support for the carriage, a threaded rod passing longitudinally through the carriage parallel with the guide rods, a vertically slidable latch mounted upon one end of the carriage and having a slot through which the threaded rod passes, a spring on the carriage below the latch acting on the latch to hold it normally in engagement with the threaded rod, the upper end of the latch projecting above the carriage whereby it may be depressed and released from the rod and a cutter supported by and projecting from the opposite end of the carriage.

3. A cheese-cutting mechanism comprising a carriage, a support therefor, means for adjusting the carriage along the support, an arm projecting forwardly from the carriage, an indicator chart depending from the front end of said arm and movable therewith in proximity to and parallel with a cheese to be cut to locate a predetermined point of the chart at the end of the cheese, and a cutter pivotally mounted upon the end of the carriage and projecting forwardly therefrom beyond the chart immediately adjacent the chart.

4. A cheese-cutting mechanism comprising a carriage, a support therefor, means for adjusting the carriage along the support, a lever pivoted upon the carriage and having a longitudinal groove in one side, a knife carried by the free end portion of the lever, and a latch spring secured upon the carriage and having its free end arranged to engage the groove in the side of the lever when the lever is raised whereby to maintain the lever in the raised position.

5. A cheese-cutting mechanism comprising a carriage, a support therefor, means for adjusting the carriage along its support, a lever pivoted to the carriage and projecting forwardly therefrom, a knife carried by and depending from the free end portion of the lever, a bracket secured to and projecting forwardly from the carriage immediately adjacent the lever, a pocket at the front free end of said bracket in proximity to a cheese to be cut, and a freely removable indicator chart fitted in said pocket.

In testimony whereof we affix our signatures.

JOHN E. KEYS. [L. S.]
OPIE P. KEYS. [L. S.]